United States Patent [19]

McNeill

[11] Patent Number: 5,654,637
[45] Date of Patent: Aug. 5, 1997

[54] METHOD FOR DETECTING BURIED HIGH CONDUCTIVITY OBJECTS INCLUDING SCALING OF VOLTAGES FOR ELIMINATING NOISE OF A PARTICULAR DEPTH

[75] Inventor: James Duncan McNeill, Chester, Canada

[73] Assignee: Geonics Limited, Mississauga, Canada

[21] Appl. No.: 444,799

[22] Filed: May 19, 1995

[51] Int. Cl.⁶ .................................................. G01V 3/11
[52] U.S. Cl. ............................................................ 324/329
[58] Field of Search .......................... 324/225, 207.12, 324/207.26, 207.15, 228, 239, 243, 326, 327, 329, 67

[56] References Cited

U.S. PATENT DOCUMENTS

| | | | |
|---|---|---|---|
| 3,617,865 | 11/1971 | Hakata | 324/326 |
| 3,893,025 | 7/1975 | Humphreys, Jr. | 324/326 |
| 4,639,674 | 1/1987 | Rippingale | 324/326 |
| 4,849,692 | 7/1989 | Blood | 324/207.17 |
| 5,172,056 | 12/1992 | Voisin | 324/207.17 |
| 5,307,072 | 4/1994 | Jones, Jr. | 324/244 X |
| 5,391,988 | 2/1995 | Kitagawa | 324/240 |

FOREIGN PATENT DOCUMENTS

| | | | |
|---|---|---|---|
| 59-183387 | 10/1984 | Japan | 324/326 |
| 59-117665 | 12/1985 | Japan | 324/326 |

OTHER PUBLICATIONS

Determination of Depth of Shallowly Buried Objects by Electromagnetic Induction, Das et al., IEEE Transactions on Geoscience & remote Energy, vol. GE23, #1, Jan. 1985.

"EM61 High Sensitivity Metal Detector") Geonics Limited, Jul. 1993.

"Buried Metal Detection with the EM61") Jul. 1993.

Primary Examiner—Sandra L. O'Shea
Assistant Examiner—Roger C. Phillips
Attorney, Agent, or Firm—Ridout & Maybee

[57] ABSTRACT

A method for surveying terrain uses transient magnetic fields transmitted from a coil in plane parallel to and above the terrain, transient voltage response from vertically spaced receiver coils coaxial with and parallel to the transmitter coil being processed to detect highly conductive objects buried in the terrain, with the ratio of the response of the coils optionally being used to estimate the depth of objects. The responses from the coils are scaled in a predetermined ratio to provide cancellation of the response from objects in a layer of terrain at a particular depth, which layer may be at the surface to remove surface responses, or beneath the surface so as to allow surface objects to be differentiated from deeper objects by providing responses of opposite polarity.

3 Claims, 1 Drawing Sheet

METHOD FOR DETECTING BURIED HIGH CONDUCTIVITY OBJECTS INCLUDING SCALING OF VOLTAGES FOR ELIMINATING NOISE OF A PARTICULAR DEPTH

BACKGROUND OF THE INVENTION

1. Field of the Invention

This invention relates to the location of buried objects utilizing electromagnetic induction techniques.

2. Description of Related Art

In a paper entitled "Determination Of Depth Of Shallowly Buried Objects By Electromagnetic Induction", IEEE Transactions on Geoscience and Remote Sensing, Vol. GE23, No. 1, January 1985, bas, McFee and Chesney, the authors describe a method of determining the depth of a shallowly buried metallic object, or targets utilizing a transmitter coil in a plane parallel to and above terrain to be investigated and two receiver coils in spaced planes parallel to the transmitter plane and above terrain to be investigated, an electrical current in the transmitter coil being controlled to apply a pulsed magnetic field to the terrain and the transient response of the receiver coils being monitored; the different amplitude response of the receiver coils to a detected anomaly permits the depth of the anomaly to be determined. The theoretical basis of this technique and its experimental verification are set forth in the paper and will not be repeated here. We have successfully constructed and tested portable apparatus embodying the technique; by transporting the apparatus in repeated spaced passes over an area of terrain, it is possible to map targets buried in the terrain.

In many cases, the accuracy and information content of a map so produced can be prejudiced by presence of multiple superposed targets: most often the problem arises from nearby surface conductors which provide strong responses which can mask that of more deeply buried targets, but problems can also arise from large, highly conductive objects underlying intended targets such as might occur in searching for unexploded ordnance.

SUMMARY OF THE INVENTION

We have now found that it is practicable to eliminate such undesired responses and enhance the detection of intended targets without modifying the basic survey technique and without modification to the basic components of the apparatus utilized, i.e. the transmitter and receiver coils and their associated transmitter and receivers.

The paper referenced above shows that the ratio of voltage responses to an object in the two receiver coils at any given elapsed time after excitation of the terrain by a magnetic pulse from the transmitter is sufficiently predictable, over a range of elapsed times and depths, for the ratio to be a usable indicator of depth of an object which is not unduly large relative to the depth of the object.

A corollary of the above relationship is that an object at a known depth will provide a predictable ratio between the voltage response of the two receiver coils, and we have appreciated that this fact can be utilized to enhance the performance of the apparatus.

Assuming that the heights of the receiver coils above the terrain surface are reasonably constant, the voltage responses of the coils can be amplified in inverse ratio to the ratio corresponding to a given depth, and subtracted one from the other to provide a signal from which response from targets at that depth has been eliminated. The extent of elimination will decrease for targets above or below the given depth, which may be arbitrarily selected so as substantially to eliminate responses from a selected depth, typically at or near the terrain surface.

The invention will be described further with reference to the accompanying drawings.

DESCRIPTION OF THE PREFERRED EMBODIMENT

Figure 1:
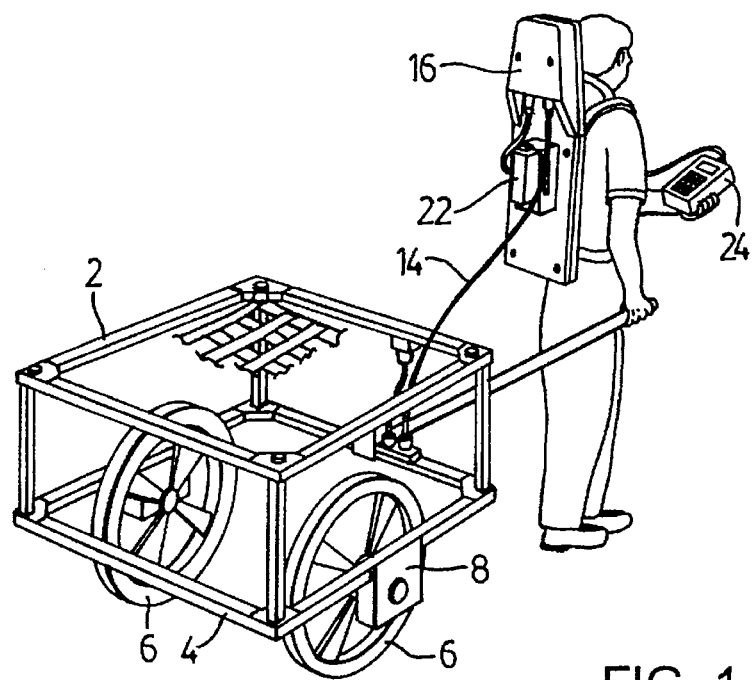
FIG. 1 illustrates in perspective apparatus suitable for carrying out the method of the invention.

Referring to FIG. 1, the apparatus shown is a high sensitivity metal detector sold by Geonics Limited under the designation EM61, shown equipped with a secondary receiver coil 2 spaced 40 cm above a primary coil 4 both coils being located in parallel planes parallel to the ground by being formed into a space frame supported on terrain being surveyed by wheels 6, which maintain the primary coil about 45 cm above the terrain. One of the wheels may be associated with an odometer pulse generator 8 which generates a pulse at regular intervals, typically about 20 cm. The primary coil includes a transmitter winding 10 as well as a receiver winding 12 (see FIG. 2), or with suitable circuitry the same winding may serve alternately for transmission and reception. The various windings and the pulse generator are connected through a cable 14 to a backpack 16 containing a transmitter 18 and receiver circuits 20 (see FIG. 2) and a battery pack 22, the circuits in turn being connected to a control and data logging unit 24. Further details of operation of the unit not directly relevant to the present invention may be found in the Operating Instructions supplied with the EM61 instrument.

Figure 2:
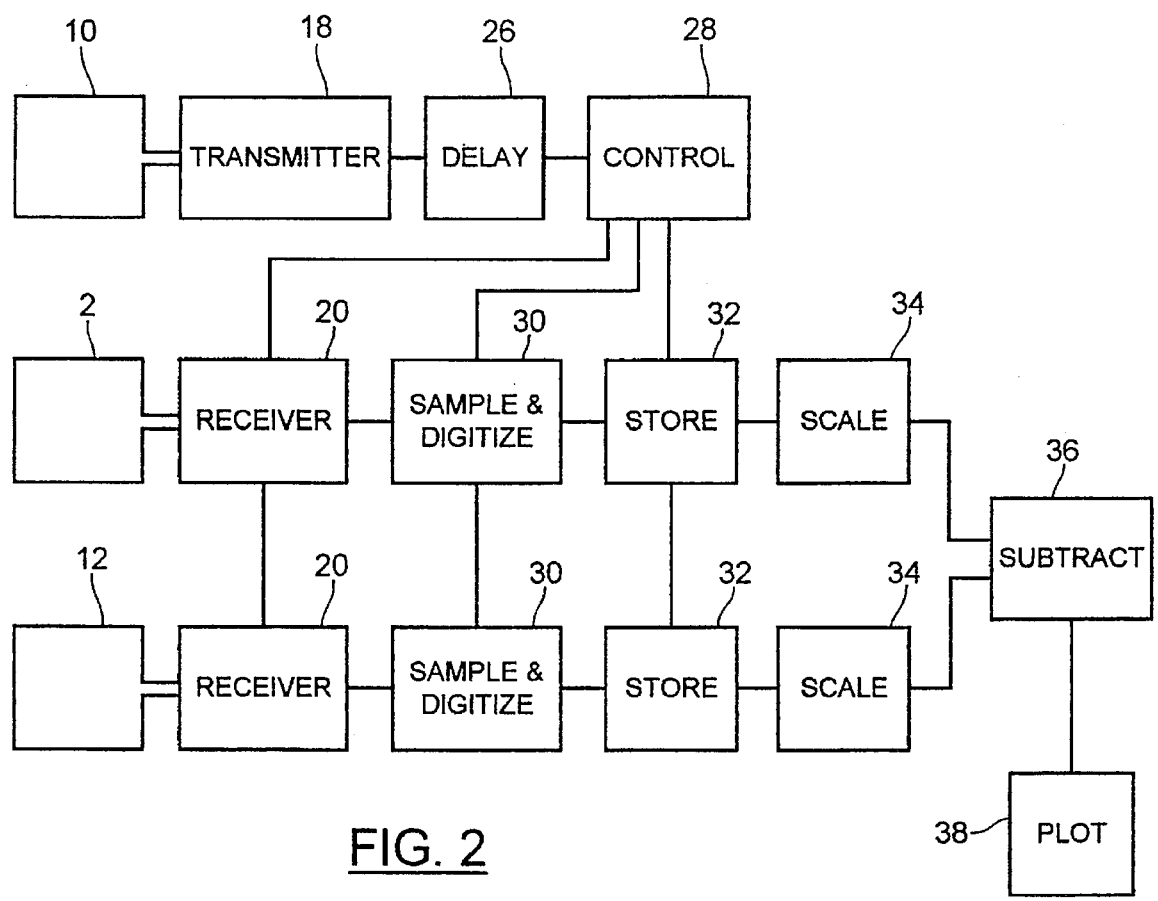
FIG. 2 is a block diagram showing signal processing functions of the apparatus.

A program which operates the data logging unit 24 cooperates with a program run on a separate computer to process and plot the logged data. Overall functioning of the system is shown in FIG. 2, which shows the transmitter winding 10 coupled to transmitter 18. The transmitter is typically a square wave current source at a convenient frequency, for example 75 Hz. A delay circuit 26 derives a delayed trigger signal for the transmitter which is passed from a control circuit 28, typically implemented by a microprocessor.

The transient responses from the receiver coils 2 and 12 are passed to receivers 20 in which they are amplified. The control circuit 28 blanks the receivers during the transitions of the square wave to prevent their being overloaded by direct response to the rapidly changing current in the transmitter coil while sampling circuits 30 sample and digitize the received signal under control of the circuit 28. Selected samples are stored in stores 32, implemented within the data logging unit 24. The selection of digitized samples to be stored is determined by user input to the unit 24, and may involve storing samples at predetermined time intervals, or at space intervals determined by pulses from the pulse generator 8, or at intervals manually selected by user input to the unit 24. Whichever way samples are selected, the pairs of samples stored are appropriately identified so that plots may be derived from the stored data. In practice stored samples may represent the summation of multiple samples taken over a gated time interval, in order to reduce the influence of noise and spurious responses.

In order to interpret the stored data, pairs of samples from the receiver coils 2 and 12 are passed from the stores 32 to a processing circuit which may be implemented by an appropriately programmed general purpose computer. This processing circuit implements a scaler 34 in at least one channel, so as to scale the digitized samples of the pair in a predetermined ratio and then subtracts one from the other in a subtraction step 36 to provide a difference signal, the amplitude of which can then be plotted by known techniques using a plotter 38. The scaling ratio applied to the signals is selected so that it is the inverse of the expected ratio between signals which would be received from a target a predetermined distance from the coils at or below the terrain surface. By this means, the response from targets at that distance is nulled out.

While it is possible to calculate the expected ratio, on the principles set forth in the article referenced above, in practice the ratio may be determined empirically by calibrating the instrument utilizing a compact highly conductive target at a known location to determine the ratio of the coil responses of a known distance or distances above the target so as to compile data as to expected ratios for each distance at which cancellation of target responses may be required. This data may then be utilized to set the scalers 34. It will also be appreciated that equivalent differential responses from the receiver coils may be obtained by making one coil larger than the other, as described in the paper referenced above, rather than spacing the planes of the coils as described herein. Thus such size differentiation of the coils should be regarded as functionally equivalent to the axial separation set forth in the appended claims.

As an alternative to selecting a ratio resulting in cancellation of responses from a given terrain layer, the ratio may be selected so that the response from objects in that layer assume a reverse polarity from responses in another layer nearer to or further from the coils. Typically, this technique can be used to distinguish responses from surface objects from more deeply buried objects; there will still be an intermediate layer of given depth in which the response from objects will be cancelled, but the technique may facilitate the identification of more deeply buried objects. For example, the cancellation depth may be set to 15 cm below the terrain surface, so that shallower objects will provide a response of one polarity, and deeper objects will provide a response of opposite polarity.

A similar technique may also be utilized to cancel responses from a nearby source of interference, such as overhead or underground power lines, since the coils will have different responses to this noise.

I claim:

1. A method of surveying terrain for buried objects, comprising moving a set of coaxial coils, including coils acting as a transmitter coil and two axially spaced receiver coils, all in planes parallel to and a controlled distance above a surface of the terrain, through a survey grid above the terrain while energizing the transmitter coil to apply a series of magnetic field transients to the terrain, simultaneously recording the voltage responses from the two receiver coils at predetermined intervals after each magnetic field transient in the series, and differencing the recorded voltage responses, wherein the improvement comprises scaling the voltage responses from the two receiver coils prior to differencing in a predetermined ratio selected so as to substantially eliminate responses from a terrain layer of predetermined depth.

2. A method according to claim 1, wherein the predetermined depth is zero, so as to eliminate surface responses.

3. A method according to claim 1, wherein the terrain layer of predetermined depth is below a surface of the terrain, such that objects above the layer provide a response of one polarity, and objects below the layer provide a response of opposite polarity, whereby surface objects and more deeply buried objects may be distinguished.

\* \* \* \* \*